United States Patent
Veit

(10) Patent No.: US 7,419,043 B2
(45) Date of Patent: *Sep. 2, 2008

(54) CONVEYOR SYSTEM WITH DIVERTING TRACK NETWORK

(75) Inventor: Frank W. Veit, Spring Lake, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/422,217

(22) Filed: Jun. 5, 2006

(65) Prior Publication Data

US 2006/0207858 A1   Sep. 21, 2006

Related U.S. Application Data

(60) Continuation of application No. 10/907,970, filed on Apr. 22, 2005, now Pat. No. 7,055,669, which is a division of application No. 10/284,591, filed on Oct. 31, 2002, now Pat. No. 6,923,308.

(60) Provisional application No. 60/397,885, filed on Jul. 23, 2002, provisional application No. 60/343,708, filed on Nov. 1, 2001.

(51) Int. Cl.
   *B65G 47/46* (2006.01)
(52) U.S. Cl. .............................. 198/370.02; 198/370.07
(58) Field of Classification Search ............ 198/370.02, 198/370.07
   See application file for complete search history.

(56) References Cited

U.S. PATENT DOCUMENTS 3,361,247 A    1/1968   Lauzon et al.
(Continued)

OTHER PUBLICATIONS

International Search Report from corresponding International Application No. PCT/EP02/12198, dated Jan. 20, 2003.
(Continued)

*Primary Examiner*—Gene O. Crawford
*Assistant Examiner*—Leslie Nicholson, III
(74) *Attorney, Agent, or Firm*—Van Dyke, Gardner, Linn & Burkhart, LLP

(57) ABSTRACT

A conveyor sorter includes a conveying surface movable in a longitudinal direction and a plurality of pusher shoes capable of traveling laterally of the conveying surface. At least one diverting rail is configured to selectively guide at least one of the pusher shoes laterally of the conveying surface. At least one diverter associated with the diverting rail is adapted to selectively transfer one or more pusher shoes to the diverting rail. The diverting rail has at least a first portion and a second portion. The first portion is at a first angle with respect to the longitudinal direction and the second portion is at a second angle with respect to the longitudinal direction that is different from the first angle. A pusher shoe guided by the diverting rail travels at a first lateral rate along the first portion and at a second, different lateral rate along the second portion. The first angle may be less than the second angle and a pusher shoe guided by the diverting rail traveling at the first lateral rate initially contacts an article on said conveying surface at the first portion. The second lateral rate would be higher than the first lateral rate for the duration of the diverting of the article. The diverting rail may be at least partially curved thereby providing a gradual junction between the first and second portions.

28 Claims, 11 Drawing Sheets

U.S. PATENT DOCUMENTS

| | | | |
|---|---|---|---|
| 4,501,365 A * | 2/1985 | Peyton et al. | 209/548 |
| 4,711,341 A | 12/1987 | Yu et al. | |
| 4,732,259 A * | 3/1988 | Yu et al. | 198/368 |
| 4,738,347 A | 4/1988 | Brouwer et al. | |
| 4,884,677 A | 12/1989 | Yu et al. | |
| 4,896,760 A | 1/1990 | Triantafilou et al. | |
| 5,038,912 A | 8/1991 | Cotter | |
| 5,127,510 A | 7/1992 | Cotter et al. | |
| 5,165,515 A | 11/1992 | Nitschke et al. | |
| 5,167,315 A * | 12/1992 | Doane | 198/890 |
| 5,191,959 A | 3/1993 | Leemkuil | |
| 5,409,095 A | 4/1995 | Hoshi et al. | |
| 5,927,465 A * | 7/1999 | Shearer, Jr. | 198/370.02 |
| 6,041,909 A * | 3/2000 | Shearer, Jr. | 198/370.02 |
| 6,390,274 B1 | 5/2002 | Snedecor | |
| 6,419,073 B1 | 7/2002 | Piron | |
| 6,481,559 B1 * | 11/2002 | Maeda et al. | 198/370.02 |
| 6,513,642 B1 * | 2/2003 | Shearer et al. | 198/370.02 |
| 6,615,972 B2 | 9/2003 | Veit et al. | |
| 6,814,216 B2 | 11/2004 | Veit et al. | |
| 6,866,136 B2 | 3/2005 | Veit et al. | |
| 2003/0079971 A1 | 5/2003 | Veit | |
| 2005/0000779 A1 | 1/2005 | Neiser et al. | |
| 2005/0167240 A1 | 8/2005 | Veit et al. | |

OTHER PUBLICATIONS

Drawing A of prior art conveyor sorter dated 1993.

* cited by examiner

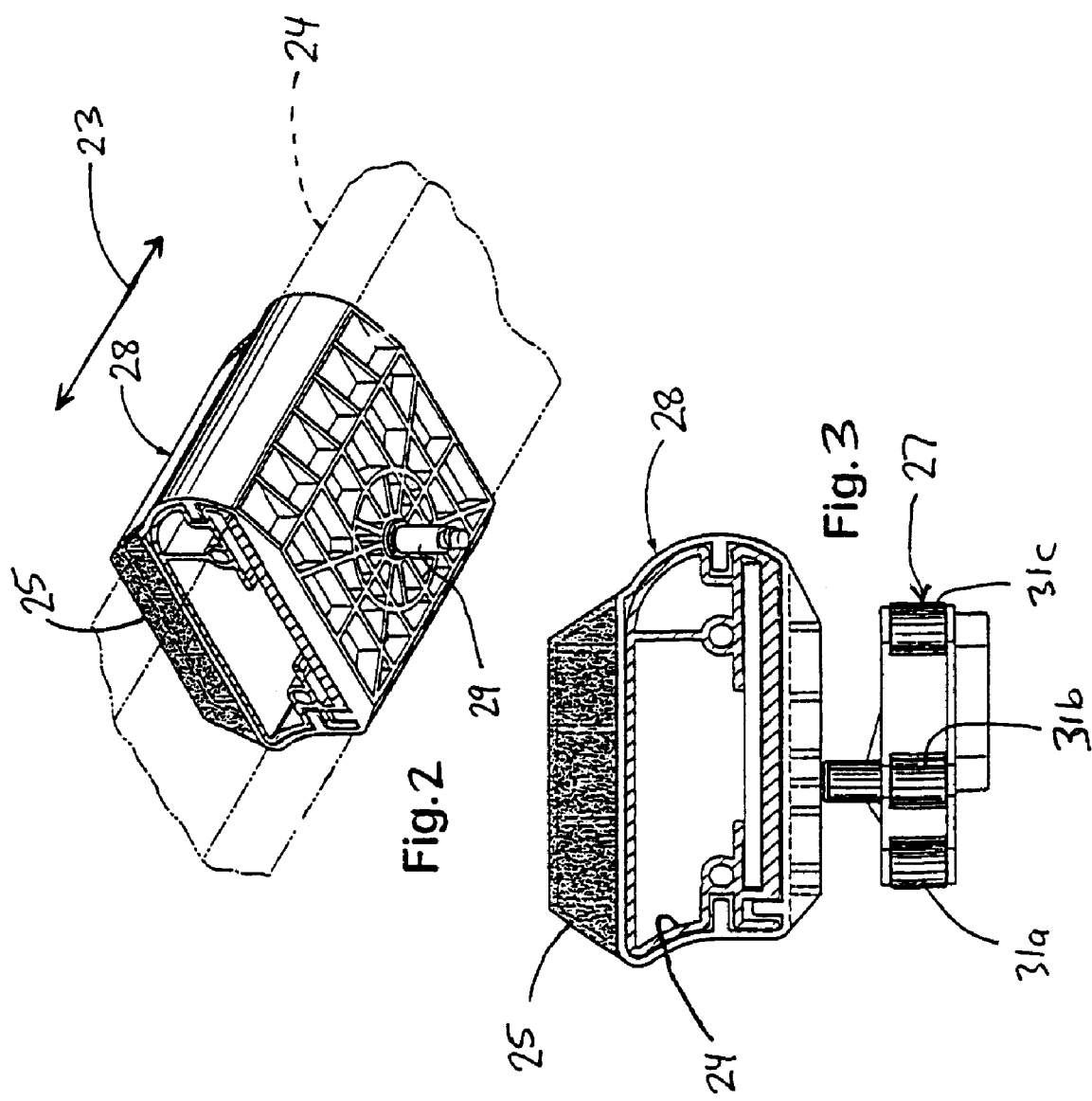

CONVEYOR SYSTEM WITH DIVERTING TRACK NETWORK

CROSS-REFERENCE TO RELATED APPLICATIONS

This application is a division of U.S. patent application Ser. No. 10/284,591, filed Oct. 31, 2002, now U.S. Pat. No. 6,923,308, which claims priority from U.S. provisional application Ser. No. 60/397,885, filed Jul. 23, 2002, and U.S. provisional application Ser. No. 60/343,708, filed Nov. 1, 2001, the disclosures of which are hereby incorporated herein by reference.

BACKGROUND OF THE INVENTION

This invention relates generally to conveyor diverting systems, and more particularly to conveyor diverting systems having an endless conveying surface composed of multiple surface members, each one or group of adjacent ones mounted with a laterally movable shoe capable of diverting packages or other articles from the conveying surface by pushing laterally against the articles as they move down the conveyor. Such lateral pushing diverts a package from a main conveyor to an adjacent branch conveyor, or other receiving structure.

Conveyor diverting systems using a moving conveying surface consisting of a plurality of parallel surface members have been known for a number of years. Such diverting systems utilize a diverter shoe movably mounted on one or more of the surface members for lateral movement with respect to the conveying surface under the guidance of a track network. Such a system is disclosed, for example, in commonly-assigned U.S. Pat. No. 5,127,510 issued to Cotter et al., and commonly-assigned U.S. Pat. No. 5,165,515 issued to Nitschke et al., the disclosures of which are hereby incorporated herein by reference. The track network is located generally under the conveying surface and guides the diverter shoes via follower portions descending from the diverter shoes and engaging the track network. Diverters or diverter switches in the track network selectively transfer guidance of each diverter shoe from a track running in the direction of the movement of the conveying surface to a diagonal track, or plurality of diagonal tracks, in order to cause lateral movement of the diverter shoes. Examples of diverter switches used to selectively transfer guidance of diverter shoes between tracks are disclosed in U.S. Pat. No. 5,409,095, issued to Hoshi et al., and U.S. Pat. No. 5,039,912, issued to Cotter, and International Publication No. WO 01/83342 A1 by Bozarth et al. In order to avoid wasted spacing between variable-length packages, such diverting systems may include manual or automatic measuring means at an infeed point to cause the diverter gate associated with the selected branch conveyor to divert a selected number of shoes corresponding in general to the length of the package. Exemplary of this type of conveyor are U.S. Pat. No. 3,361,247, issued to James N. Lauzon et al. and U.S. Pat. No. 4,738,347, issued to Brouwer, the latter being commonly assigned with the present invention.

The diverters or diverter switches used to divert the shoes onto diagonal tracks are often desirably spaced apart approximately the same distance as the distance between adjacent surface members. This spacing allows adjacent diverters to divert shoes along adjacent surface members. Such spacing, however, often leaves little room for the diverter switches. In order to construct diverter switches that can operate in such spaces, it is often necessary to construct the diverter switches so that they divert shoes at a relatively steep angle. That is, the diverter switches are constructed so that they change the motion of the shoes from a state in which the shoes are traveling longitudinally with no transverse motion to one in which they have a relatively high transverse motion component. In general, the steeper the angle at which the diverter switches divert shoes in a transverse direction, the more space that is created for the physical structure of the diverting gate to occupy. Diverting the shoes at too steep of an angle, however, can cause difficulties as will be set forth in more detail below.

With increased demands for the number of packages to be conveyed by such conveying systems, the overall speed of the conveyor has become an important factor in the design of conveying systems. As a general matter, increasing the speed of the conveyor typically increases the throughput of the conveyor. Increasing the speed of the conveyor, however, can create other difficulties. For example, if the longitudinal speed of the conveyor is increased, the lateral speed of the diverter shoes will also increase during package diverts. If this lateral speed gets too great, however, the diverter shoes may impinge the package with such force that the package is toppled, knocked backwards on the conveyor, knocked off of the conveyor, or otherwise undesirably moved. While the lateral speed of the diverter shoes can be decreased by lessening the angle of the diverting tracks, as noted above, decreasing the angle of the diverting tracks may not leave sufficient room for the diverter switches to be operably installed. Also, decreasing the divert angle generally requires the adjacent take-away conveyors to take up more space in order to accommodate the greater effective width of the article when it is diverted at a smaller angle. Having larger take-away conveyors not only increases their expense, but also uses up more factory floor-space, which is often at a premium. Further, the need can therefore be seen for a diverting conveyor that mitigates the aforementioned problems associated with increased conveyor speeds.

Increased demands for package throughput also make the amount of inter-package spacing an important factor. By spacing packages closer together, more packages can be placed on a conveyor, and thus more packages can typically be processed over a given time period when they are spaced more closely together. However, a minimum inter-package spacing is desirable as a result of the rotation of a diverted package as it is diverted. Because of this rotation, additional inter-package spacing is required to avoid conflict between the package being diverted and a closely trailing package. This rotation pushes the trailing corner of the package adjacent the branch conveyor back a distance. Sufficient spacing between the packages to accommodate the backward movement of this corner is desirably included in conveyor systems. The extent of this spacing, however, is desirably reduced, and the need can be seen for a conveyor diverting system that can more effectively decrease the amount of necessary inter-package spacing.

SUMMARY OF THE INVENTION

Accordingly, the present invention provides a sortation system which mitigates a number of the above-discussed difficulties. The sortation system is designed to lessen the impact of the diverter shoes against articles without having to reduce the conveyor speed or use undesirable amounts of space in the facility or warehouse. The system also reduces the amount of spacing between articles that is necessary. The conveyor system of the present invention therefore provides a design that enables higher package throughputs to be achieved.

According to an aspect of the present invention, a conveyor sorter is provided. The conveyor sorter includes a conveying surface that is movable in a longitudinal direction. The conveyor further includes a plurality of diverting rails, a plurality of pusher shoes, and a plurality of diverters. The diverting rails extend diagonally under the conveying surface. The pusher shoes are capable of traveling across the conveying surface. Each pusher shoe includes an article contacting member that extends at least partially above the conveying surface to divert articles on the conveying surface. The pusher shoes further include follower members extending at least partially below the conveying surface to engage selected ones of the diverting rails to laterally displace articles on the conveying surface. The diverters are associated with the diverting rails and each diverter is adapted to selectively transfer at least one of the follower members onto one of the diverting rails. A plurality of the diverting rails have at least a first portion and a second portion. The first portion has a first angle with respect to the longitudinal direction, and the second portion has a second angle with respect to the longitudinal direction that is different from the first angle.

According to yet another aspect of the present invention, a method is provided for laterally displacing articles on a conveying surface traveling in a longitudinal direction. The method includes providing a plurality of pusher shoes, selecting particular ones of the pusher shoes to laterally displace an article on the conveying surface, and laterally displacing the selected pusher shoes. The lateral displacement of the selected pusher shoes is carried out at a first lateral rate during an initial portion of travel of the selected pusher shoes, and at a second lateral rate during a subsequent portion of the travel. The first and second rates are different from each other.

According to other aspects of the present invention, a third portion of the diverting tracks may be provided in addition to the first and second portions. The first portion may be adjacent one of the diverters and the second portion may be adjacent a terminal portion of a diverting track or rail. The first portion may have a greater or lesser angle than the second portion. The third portion may have the same angle as the first portion, and the angle of the third portion may be substantially the same as the angle of the take-away conveyor with respect to the main conveyor. The activation of diverters into the diverting state may be carried out such that at least two diverters are activated which are separated from each other by at least one non-activated diverter.

BRIEF DESCRIPTION OF THE DRAWINGS

FIG. 2 is a perspective view of the underside of a pusher shoe which may be used on the conveyor of FIG. 1, illustrated without a follower portion;

FIG. 3 is a side, elevational view of the pusher shoe of FIG. 2, illustrated with a follower portion attached;

DESCRIPTION OF THE PREFERRED EMBODIMENTS

Figure 1:
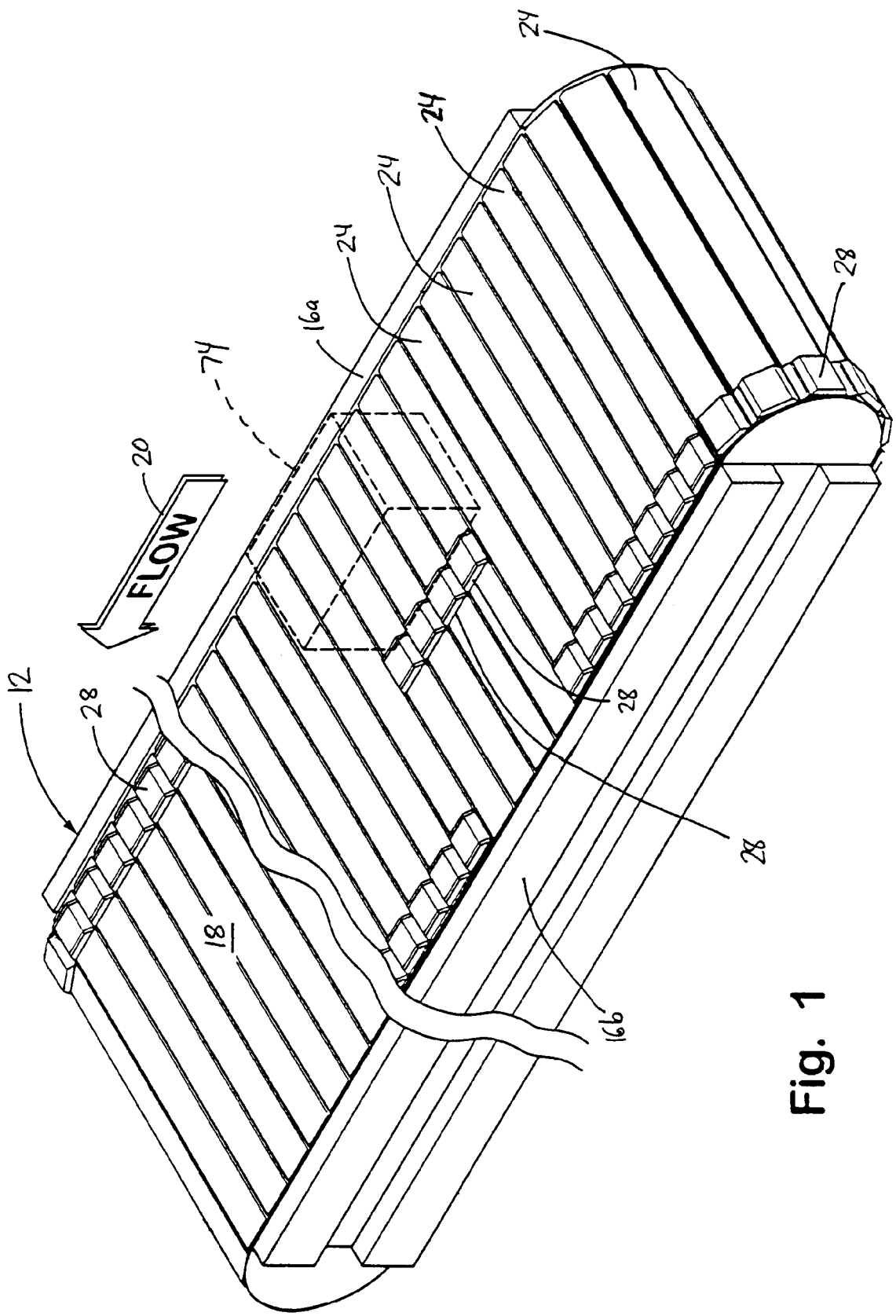
FIG. 1 is a perspective view of a sortation conveyor to which may the various aspects of the present invention may be applied.
Figure 4:
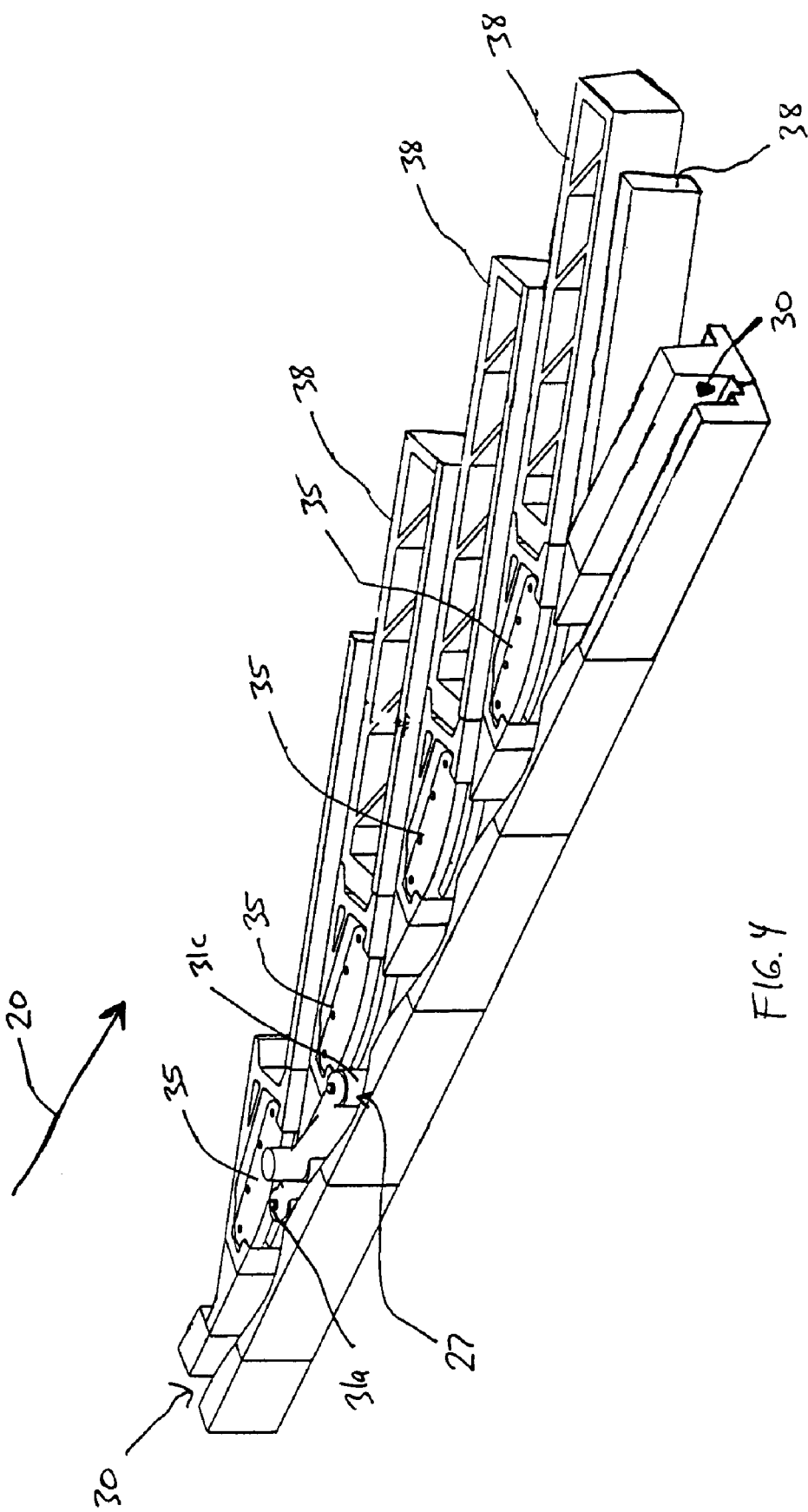
FIG. 4 is a fragmentary, perspective view of a diverting assembly which may be used in accordance with the present invention.

The present invention will now be described wherein the reference numerals in the following written description correspond to like-numbered elements in the several drawings. A sortation conveyor 12 is depicted in FIG. 1. Sorter 12 is illustrative of the types of conveyor sorters to which the various aspects of the present invention finds application. Conveyor 12 includes a conveying surface 18 defined by a series of surface members 24 that extend between sides 16*a* and *b* of sorter 12. Surface members 24 move in a direction of conveyance 20, and thereby carry articles 74 in the same direction. When articles, such as an article 74, are to be diverted off of conveyor 12 and onto one or more branch conveyors 14 (FIG. 6), a plurality of pusher shoes 28 are diverted out of their longitudinal flow path and caused to travel transversely across conveying surface 18. These shoes 28 impact the article and push it off of conveyor 12 onto the appropriate take-away conveyor 14.

An example of one type of shoe 28 that may be used in the present invention is depicted in FIGS. 2-3. Shoes 28 are slidable along the length of surface members 24 in a transverse direction 23. Shoes 28 include a diverting portion 25 and a follower portion 27. Diverting portion 25 extends above surface member 24 and impacts articles when they are diverted. Follower portion 27, which may be attached via a pin 29, or other means, extends below surface members 24 and selectively engages a series of guide tracks underlying conveying surface 18, as will be explained more below. In the example of FIG. 3, follower portion 27 is a toggle consisting of three bearings 31*a*, *b*, and *c*. Follower portion could alternatively be constructed of a single bearing attached to a pin, such as is disclosed in commonly-assigned U.S. Pat. No. 5,127,510 issued to Cotter et al, entitled MODULAR DIVERTER SHOE AND SLAT CONSTRUCTION, the disclosure of which is hereby incorporated herein by reference. It will be understood that follower portion 27 may take on other constructions, as well.

Figure 6:
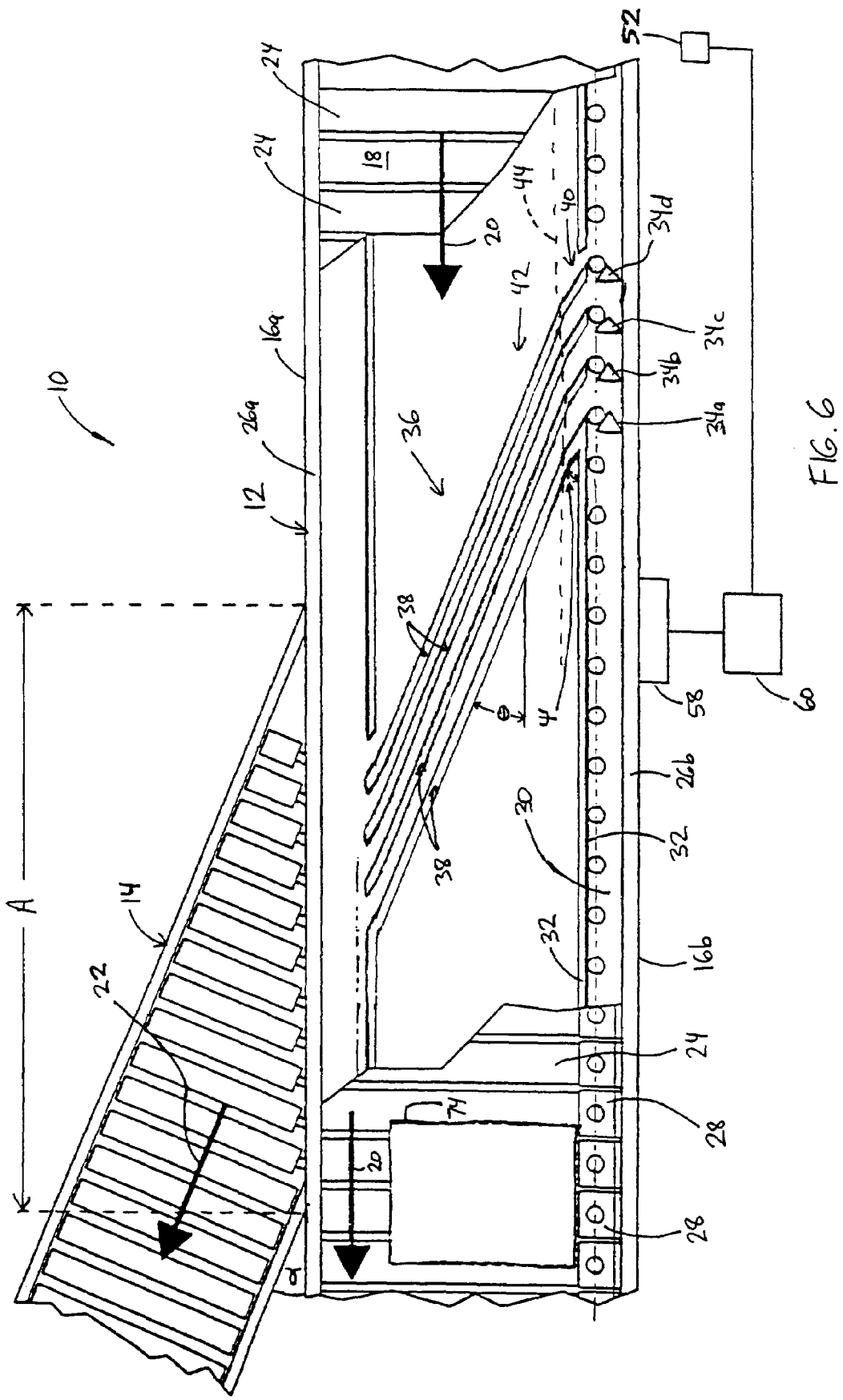
FIG. 6 is a top plan view of a sortation assembly for a conveyor system according to one aspect of the invention, illustrated with a center portion of the conveying surface removed to illustrate the underlying structure.
Figure 8:
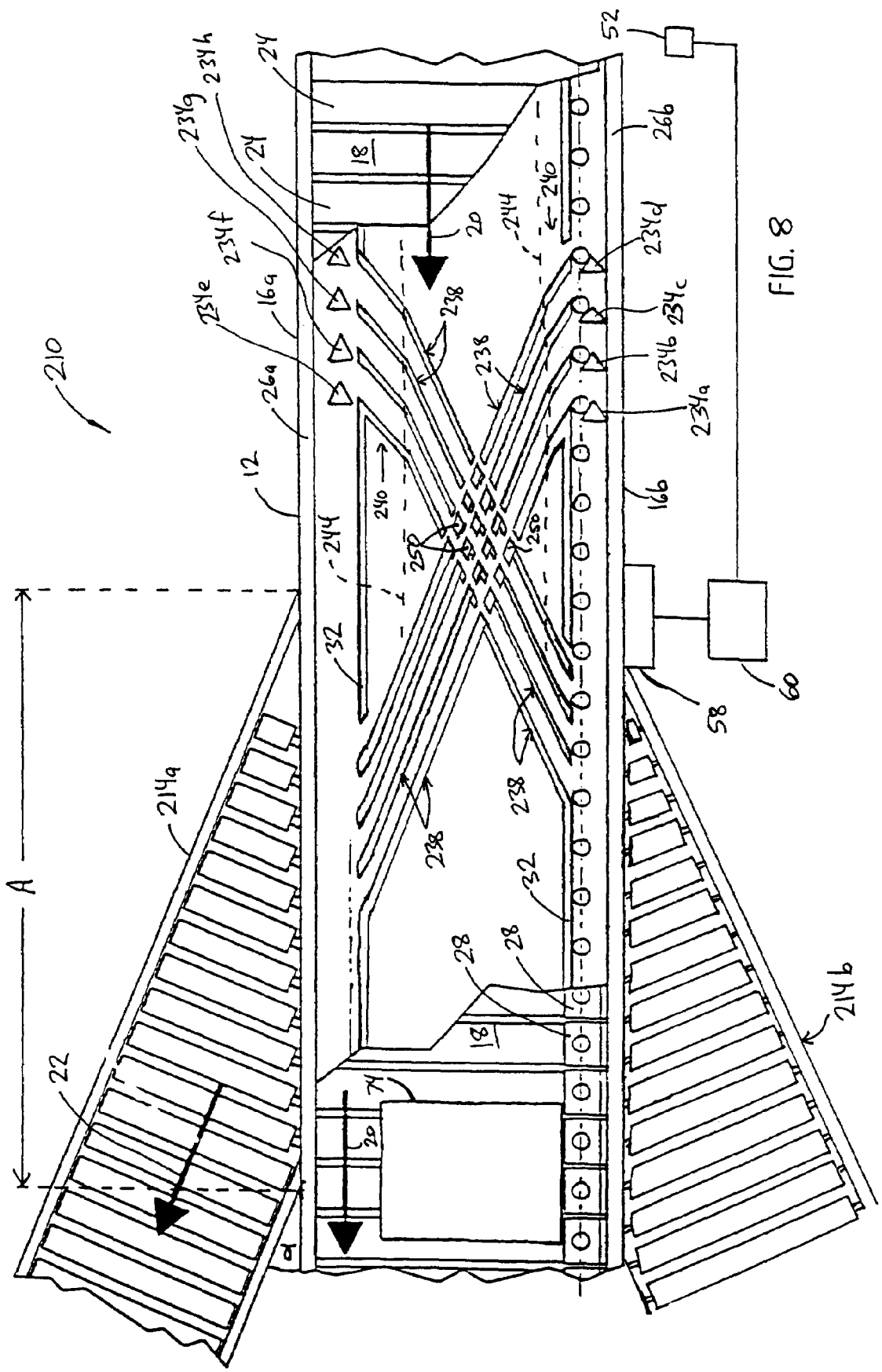
FIG. 8 is a top plan view, similar to FIG. 6, of a sortation assembly for a conveyor system according to still another aspect of the invention.

Referring specifically to FIG. 6, a conveying system 10 includes a main conveyor 12 and a branch conveyor 14. Additional branch conveyors beyond the single branch conveyor 14 may be placed alongside main conveyor 12. The embodiment of FIG. 6 is illustrated for use with a unidirectional divert conveyor which diverts articles to one lateral side 16*a* of a conveying surface 18. It should be understood that its principles may also be used with a bi-directional divert conveyor which diverts articles selectively to either lateral side 16*a* or 16*b* of the conveyor surface 18. An example of a bi-directional divert conveyor is depicted in FIG. 8. Branch conveyor 14 is positioned adjacent to main conveyor 12, and at an angle α, as is conventional. Arrow 20 illustrates the direction of conveyance for main conveyor 12. Arrow 22 illustrates the direction of conveyance for branch conveyor 14.

As noted above, conveying surface 18 of main conveyor 12 is defined by a series of surface members 24. The lengthwise direction of surface members 24 is oriented perpendicular to the direction of movement 20 of main conveyor 12. Surface members 24 are supported on either side by side members 26a and b. Surface members 24 may be connected to a motor by a chain or other means to propel them in the direction of conveyance 20. The detailed construction of the conveying surface may take the form of that disclosed in U.S. Pat. No. 5,127,510, issued to Cotter et al., although other constructions are possible. Alternatively, the surface members 24 may be interconnected with each other and propelled by linear motors, such as is disclosed in commonly-assigned International Application No. PCT/EP01/11264 (WO 02/26602 A2) filed Sep. 28, 2001, entitled POSITIVE DISPLACEMENT SHOE AND SLAT SORTER APPARATUS AND METHOD, the disclosure of which is hereby incorporated herein by reference.

The movable pushers, or diverting shoes, 28 are located along main conveyor 12, opposite branch conveyor 14 and proximate to side member 26b. Diverting shoes 28 include a follower portion 27, such as a downwardly depending pin and attached bearing or other structure, that can be engaged by tracks lying underneath conveying surface 18, as will be described more herein. As noted, diverting shoes 28 may be configured like those illustrated in FIGS. 2-3, or like those disclosed in the aforementioned U.S. Pat. No. 5,127,510, or the aforementioned International Patent Application No. PCT/EP01/11264 (WO 02/26602 A2), or they may take on other forms. When diverting shoes 28 are not displacing an article off main conveyor 12 and onto branch conveyor 14, they travel in sequence along a shoe guideway 30, adjacent a longitudinally extending guide track 32. Guide track 32 prevents diverting shoes 28 from moving transversely across main conveyor 12 by blocking lateral movements of the bearings or other structures that extend downward from the shoes 28. Only at the point along main conveyor 12 at which diverters 34a through 34d are located, or along similar points where a branch conveyor connects to main conveyor 12, are shoes 28 free to move laterally.

Diverters 34a through 34d can be seen attached along side member 26b of main conveyor 12, and in the path of diverting shoes 28. Diverters 34a through 34d may be of the type disclosed in commonly-assigned U.S. Pat. No. 5,038,912, issued to Cotter, U.S. Pat. No. 5,409,095, issued to Hoshi et al., U.S. Pat. No. 6,615,972, issued to Veit et al. or International Patent Application No. PCT/EP01/04746 (WO 01/83342) filed Apr. 26, 2001, entitled SORTATION SYSTEM DIVERTER SWITCH, the disclosures of which are hereby incorporated herein by reference. Other diverters known in the art may also be used.

Figure 5:
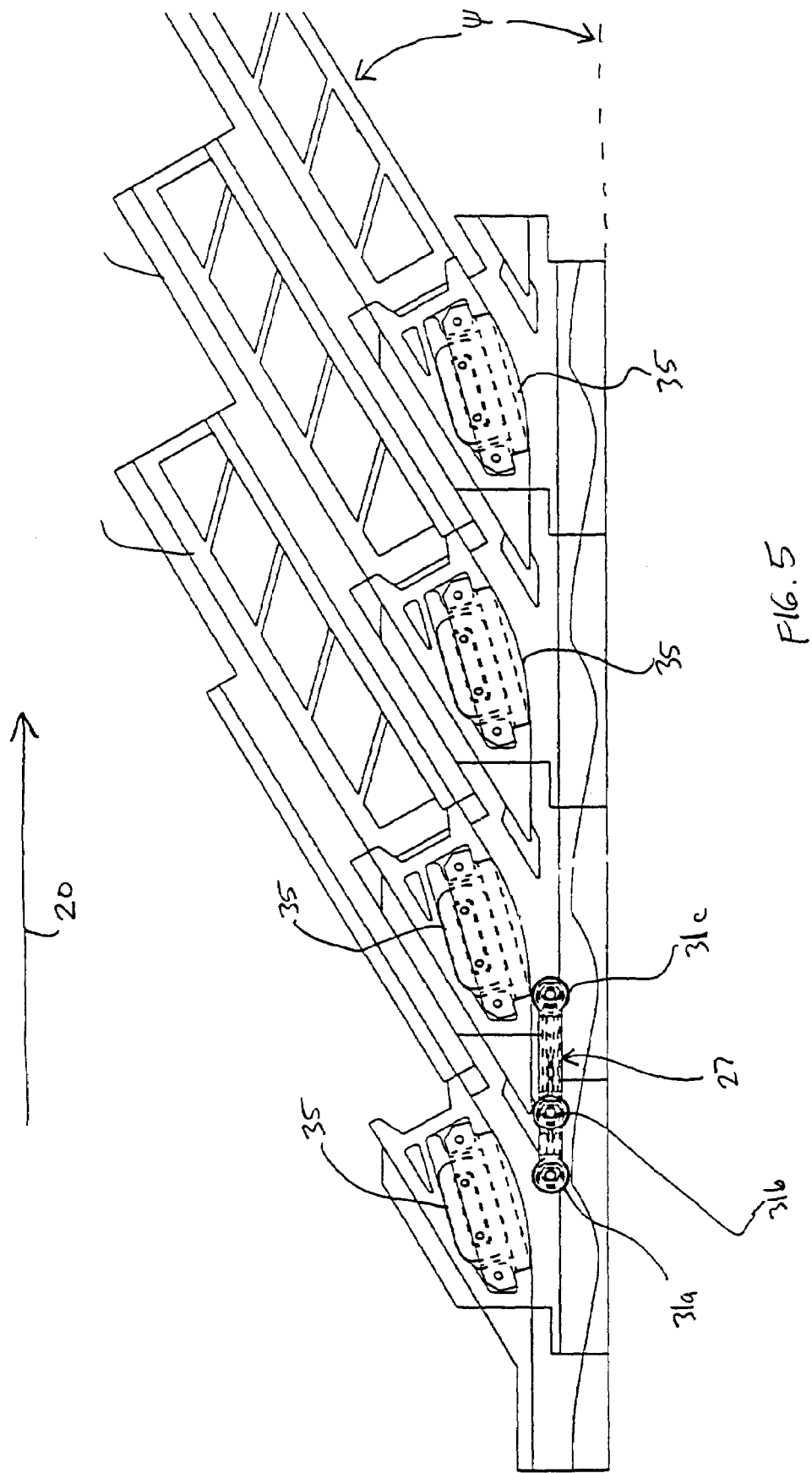
FIG. 5 is a plan view of the diverting assembly of FIG. 4.

One embodiment of diverters 34 that may be used in accordance with the present invention is depicted in FIGS. 5 and 6. Four diverters 34a-d are depicted in each of these drawings. Diverters 34a-d each include an electromagnet 35 that is positioned adjacent guideway 30. Each electromagnet 35 is selectively energizable. When energized, the magnetic field created by electromagnet 35 creates an attractive force that attracts follower portion 27 of diverting shoes 28. This attractive force causes follower portion 27 to switch from traveling along guideway 30 to traveling along one of the diverting tracks 38 that is closest to the activated electromagnet 35. When an article is to be diverted from conveying surface 18, one or more selected diverters 34 are activated by energizing their associated electromagnet 35. After the appropriate number of shoes 28 have been diverted, the electromagnet 35 is de-energized, and subsequent shoes 28 that travel by the electromagnet 35 are not diverted.

With reference to FIGS. 6-10, a section of conveying surface 18 has been removed from the central portion of main conveyor 12 to illustrate the structure of an underlying diverting track network 36. Diverting track network 36 includes a plurality of diverting tracks 38. While FIGS. 6-10 depict four diverting tracks 38, it will be understood by one skilled in the art that the invention is not limited to four diverting tracks. Instead, other numbers of diverting tracks can be used. In the embodiment depicted in FIG. 6, each diverting track 38 includes a first portion 40 and a second portion 42. First portion 40 is located generally adjacent diverters 34a-d. First portion 40 extends from diverters 34a-d to an imaginary dividing line 44. Second portion 42 extends from dividing line 44 to the terminal end of diverting tracks 38, which is located generally adjacent branch conveyor 14. First portion 40 is oriented at an angle $\psi$ with respect to the longitudinal direction of main conveyor 12. Second portion 42 of diverting tracks 38 is orientated at an angle $\psi$ with respect to the longitudinal direction 20 of main conveyor 12. Angle $\theta$ is different than angle $\psi$. As illustrated, first portion 40 has a steeper or larger angle than second portion 42, that is, angle $\psi$ is greater than angle $\theta$. Assuming a constant longitudinal speed of main conveyor 12, diverting shoes 28 will move laterally from side 16b towards side 16a at a slower rate when they are traveling along second portion 42 than when they are traveling along first portion 40. Thus, diverting shoes 28 will initially move laterally at a higher speed until they reach imaginary dividing line 44. When they reach dividing line 44, their lateral speed will decrease as they move along second portion 42 of the diverting tracks 38. The impact of the diverting shoes 28 against an article to be diverted, which will occur along second portion 42, will therefore be less than it would be if the diverting shoes 28 were to impact against an article in first portion 40.

First portion 40 of diverting tracks 38 is generally oriented at a greater or steeper angle than second portion 42 in order to accommodate the physical construction of diverters 34a-d. Diverters 34a-d may generally require that first portion 40 of diverting tracks 38 be oriented at a steeper angle in order to provide sufficient space for diverters 34. Having a first portion 40 of diverting tracks 38 with a greater angle therefore provides more space to accommodate diverters 34a-d. This may simplify the construction of diverters 34. However, as has been noted previously, this steeper angle leads to greater speeds of diverting shoes 28 in first portion 40. Therefore, conveying system 10 may be designed to generally prevent articles from traveling closer to conveyor side 16b than dividing line 44. Stated alternatively, conveying system 10 may be designed so that articles are positioned on a side of dividing line 44 opposite diverters 34a-d. Such a design can be accomplished in any conventional manner. By designing conveying system 10 in this manner, the articles traveling on conveying surface 18 will not be impacted by diverting shoes 28 when they are traveling along first portion 40. The articles will therefore only be impacted by diverting shoes 28 when these shoes are traveling at the slower lateral speed associated with second portion 42. The impact against the articles by diverting shoes 28 is therefore lessened.

It will be understood that the precise angles of first and second portions 40 and 42 can be varied as desired. Angle $\psi$ of first portion 40 should be chosen in order to accommodate whatever diverters 34 are being used in conveying system 10. Angle θ of second portion 42 may, although not necessarily, be oriented at an angle that is equal to angle α, the orientation of take-away conveyor 14. In this manner, articles that are diverted using diverting tracks 38 may be reoriented so that their longitudinal direction is essentially parallel to direction 22, depending on how diverters 34 are activated. As one possible example, angle ψ may be 30 degrees and angle θ may be 25 degrees. Other examples are, of course, possible.

The timing and manner in which diverters 34 are activated into a diverting state can be varied as desired in the system depicted in FIG. 6. Various different protocols for selecting which diverters 34 to activate, the timing of the activation, and the length of the activation, are described in further detail herein. These methods may be used in conjunction with conveying system 10, although other methods of controlling diverters 34 can also be used.

Figure 7:
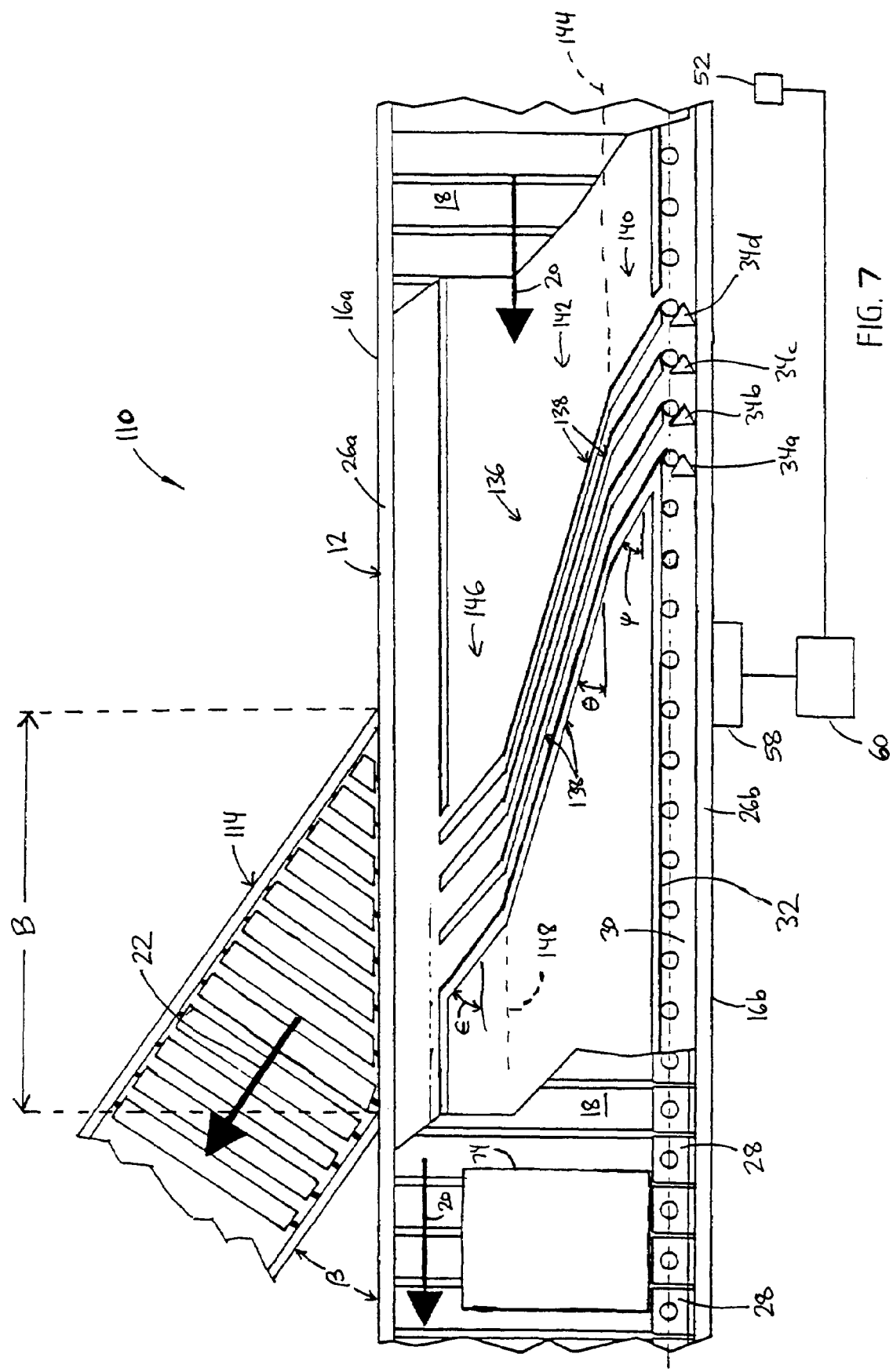
FIG. 7 is a top plan view, similar to FIG. 6, of a sortation assembly for a conveyor system according to another aspect of the invention.

A conveying system 110 according to another embodiment of the present invention is depicted in FIG. 7. Components in conveying system 110 that are the same as the components in system 10 bear the same reference numeral. Components in conveying system 110 that are modified from the components in conveying system 10 include the same reference numeral summed together with the number 100. New components in conveying system 110 that do not appear in system 10 bear new reference numerals. Conveying system 110 generally differs from conveying system 10 in the construction of diverting tracks 38 and the orientation of branch conveyor 14. Diverting tracks 138 include a first portion 140, a second portion 142, and a third portion 146. An imaginary dividing line 144 separates first and second portions 140 and 142. Another dividing line 148 separates second portion 142 from third portion 146. First portion 140 is angled with respect to the longitudinal direction of conveyance at an angle ψ. Second portion 142 is angled with respect to the longitudinal direction of conveyance 20 at an angle θ. Third portion 146 is angled with respect to the longitudinal direction of conveyance 20 at an angle ε. Angles ψ and θ may be the same or different from the angles ψ and θ illustrated in FIG. 6. Angle θ, however, is preferably less than angle ψ, as well as angle ε. The angles ψ and ε of first portions 140 and third portions 146, respectively, may be the same as each other, or different.

Like system 10, conveying system 110 may be configured so that articles traveling on main conveyor 12 do not travel over portions of conveying surface 18 that underlie first portion 140 of diverting tracks 138. In this manner, articles are not initially impacted by diverting shoes 28 that are traveling at the relatively higher lateral speed associated with first portion 140. Rather, articles traveling on conveying surface 18 are initially impacted by diverting shoes 28 traveling at the relatively slower speed associated with second portion 142. After articles are initially impacted and moved by diverting shoes 28 traveling at second portion 142, they experience an increased force when the diverting shoes reach dividing line 148. This increased force is caused by the different angular orientation of diverting tracks 138 in third portion 146.

Angle ε of diverting tracks 138 in third portion 146 may generally correspond to angle β illustrated in FIG. 7. The increased angle ε of third portion 146 allows articles to exit main conveyor 12 onto branch conveyor 14 with a higher lateral speed than what they experience from second portion 142. This higher lateral speed allows the effective width of branch conveyor 14 to be less. Specifically, the distance B illustrated in FIG. 7 is less than the distance A illustrated in FIG. 6. This is because branch conveyor 114 in FIG. 7 has a greater angle (β) than branch conveyor 14 does in FIG. 6 (α). Because branch conveyor 114 takes up less linear space along side 16a of main conveyor 112, it is possible to more closely pack together multiple branch conveyors 114 along main conveyor 112. The amount of floor space occupied by the overall conveying sortation system is therefore reduced. Further, because of the construction of diverting tracks 138, the articles being diverted in conveying system 110 are not subjected to excessive impacts or rotational forces. This is due to the fact that the articles are only initially impacted by the relatively slow moving diverting shoes traveling in second portion 42. While the articles experience increased forces when they reach third portion 146, the difference in speeds and forces between second portion and third portion 146 is significantly less than if the articles were initially impacted by shoes traveling in a diverting track having an angle equal to that of third portion 146. Conveying system 110 can therefore utilize branch conveyors 114 oriented at greater angles, while still not subjecting diverted articles to undo forces that might otherwise cause toppling, excessive rotation, or other disruptions. Conveying system 110 can therefore accommodate more branch conveyors 114 along a given length the main conveyor 12 than would otherwise be possible.

A conveying system 210 according to another aspect of the present invention is depicted in FIG. 8. Those components in conveying system 210 that are identical to those components in conveying system 10 are identified by the same reference numeral. Modified components in conveying system 210 use the same reference numeral as conveying system 10, with the exception that the number 200 has been added to them. New components are labeled using entirely new reference numerals. As has been mentioned previously, conveying system 210 is a bi-directional diverting conveying system. Stated alternatively, main conveyor 12 of conveying system 210 includes branch conveyors 214a and b positioned on both sides 16a and b. Thus, articles can be diverted off to both branch conveyor 214a and branch conveyor 214b. Conveying system 210 includes four diverters 234a-d positioned along side 16b. Conveying system 210 further includes four diverters 234e-h positioned along side 16a of main conveyor 12. Shoes 28 that are positioned upstream of diverters 234 travel along either side 16a or b of main conveyor 12. If an article is to be diverted down branch conveyor 214b, an appropriate number of diverting shoes 28 must be traveling adjacent side 16a at the appropriate time so that diverters 234e-h can be used to divert these shoes.

As illustrated in FIG. 8, there are four diverting tracks 238 associated with each set of diverters 234a-d and 234e-h. Diverting tracks 238 are generally constructed in a manner similar to diverting tracks 38. Specifically, diverting tracks 238 each include a first portion 240 and a second portion 242. A dividing line 244 separates the first and second portions for each of these diverting tracks 238. First portion 240 is angled at a greater angle than second portion 242.

Each set of four diverting tracks 238 extends laterally across main conveyor 12 between sides 16a and b. The diverting tracks 238 associated with diverters 234a-d intersect the diverting tracks 238 associated with diverters 234e-h. These intersections are labeled 250. Intersections 250 are adapted to allow shoes to keep traveling along the diverting track 238 which they originally started traveling along and are well known in the art.

Articles traveling on conveying surface 18 that are to be diverted down branch conveyor 214b are preferable positioned on the side of the upper dividing line 244 (FIG. 8) opposite diverters 234e-h. In this manner, such articles will not be impacted by diverting shoes 28 that are moving at the relatively higher lateral speed associated with first portions 240. Conveyor system 210 ensures that diverting shoes 28 are positioned on the proper side of conveyor 12 for the appropriate diverts in any known manner.

Figure 10:
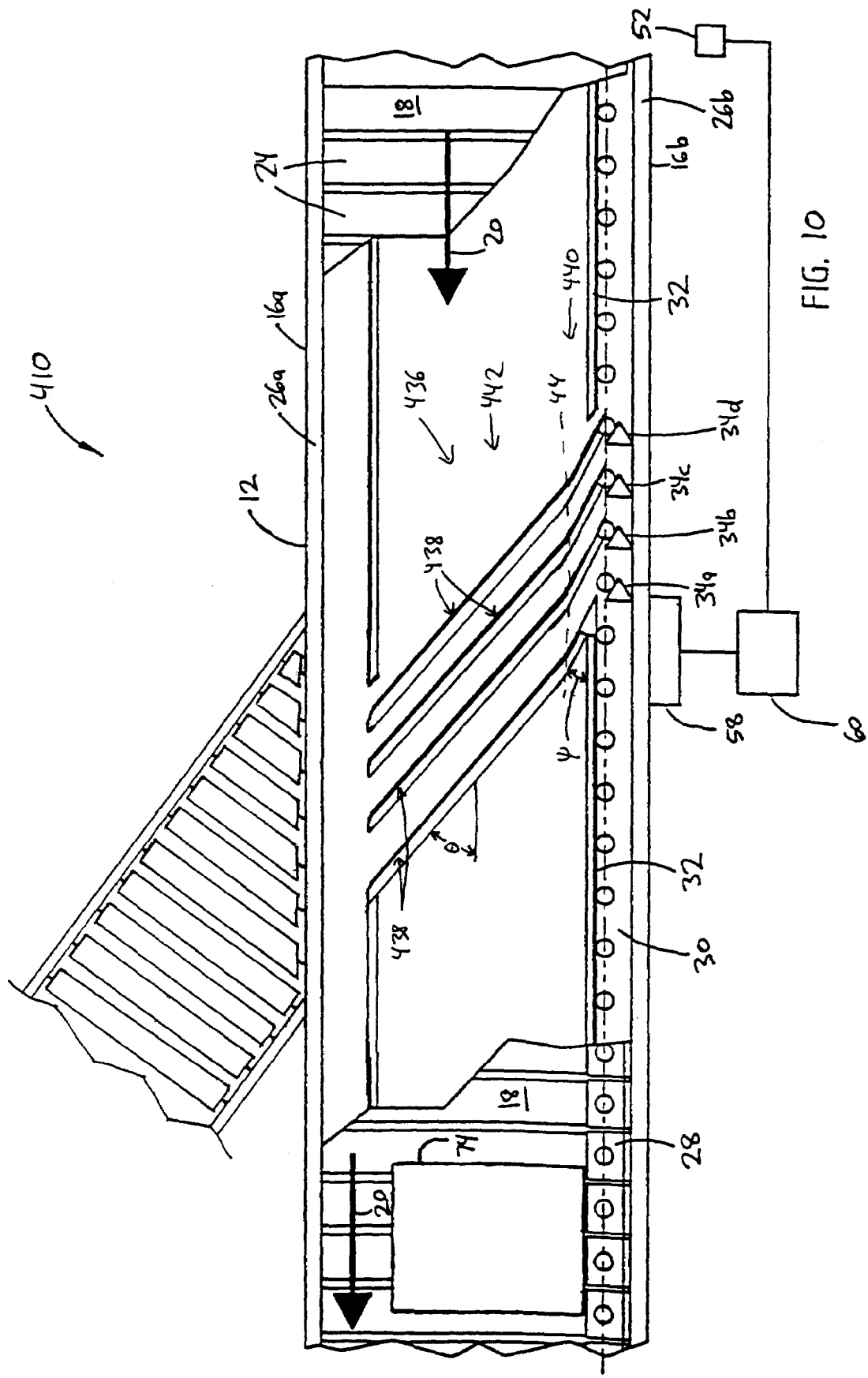
FIG. 10 is a top plan view of a conveyor sortation assembly according to still another aspect of the invention illustrating a diverting track network with dashed lines.

A conveying system 410 according to another aspect of the present invention is depicted in FIG. 10. Components of system 410 in common with system 10 bear the same reference numeral while modified components bear the same number summed with 400. System 410 includes a plurality of diverting tracks 438. Each diverting track 438 includes a first section 440 and a second section 442. First section 440 is oriented at an angle θ with respect to the direction of conveyance 20. Second section 442 is oriented at an angle θ with respect to the direction of conveyance 20. In system 410, angle ψ is less than angle θ. Thus, shoes 28 traveling along first section 440 will travel at a slower lateral speed than they will when traveling along second section 442. Angle θ may, for example, have a value as high as 45 degrees, or more.

Conveying system 410 is especially suitable to conveyor sortation applications in which the sortation system is run at relatively slow speeds. The relatively slower speeds allow second section 442 to have a steeper angle θ than they otherwise would have in a faster system. Because conveyor 12 is run at a slower speed, the increased angle θ will not give the shoes 28 such a high lateral speed as to cause toppling or other undesired movement of the articles being diverted. The operation of the sortation system at a relatively slower speed allows branch conveyor 14 to be positioned at a steeper angle with respect to main conveyor 12. This steeper angle allows more branch conveyors 14 to be positioned alongside main conveyor 12 over a given longitudinal extent of conveyor 12.

First section 440 in conveying system 410 is oriented at a smaller angle ψ than angle θ for multiple reasons. The smaller angle ψ reduces the stresses that are placed upon the follower portions 27 as they are diverted by diverters 34. Likewise, the stresses that are placed upon the diverters 34 by the impinging followers portions 27 are also reduced. Further, the smaller angle ψ may be desirable because diverters 34 may be a standard component that is desirably manufactured for use with different types of sortation systems. By constructing diverting tracks 438 in the manner illustrated in FIG. 10, the same diverters 34 that are used in higher speed sortation systems, like those of FIGS. 6-9, could also be used in system 410.

An imaginary dividing line 44 separates first sections 440 from second sections 442. If a follower portion 27 having three bearings 31 is used with conveyor system 410, system 410 may advantageously be designed so that shoes 28 do not impact against articles until after they have completely transitioned from first section 440 onto second section 442. During this transition, the two outside bearings 31a and c will bear against first section 440 and second section 442, respectively. The middle bearing 31b will temporarily be out of contact with any guide track, due to the sharpness of the angular transition between first and second sections 440 and 442. Depending on the construction of follower portion 27, it may be undesirable to solely have outside bearings 31a and c bear the load of diverting a package. To avoid this situation, system 410 may be designed so that articles always enter conveyor 12 on the side of imaginary line 44 that is closer to side 16a.

Figure 9:
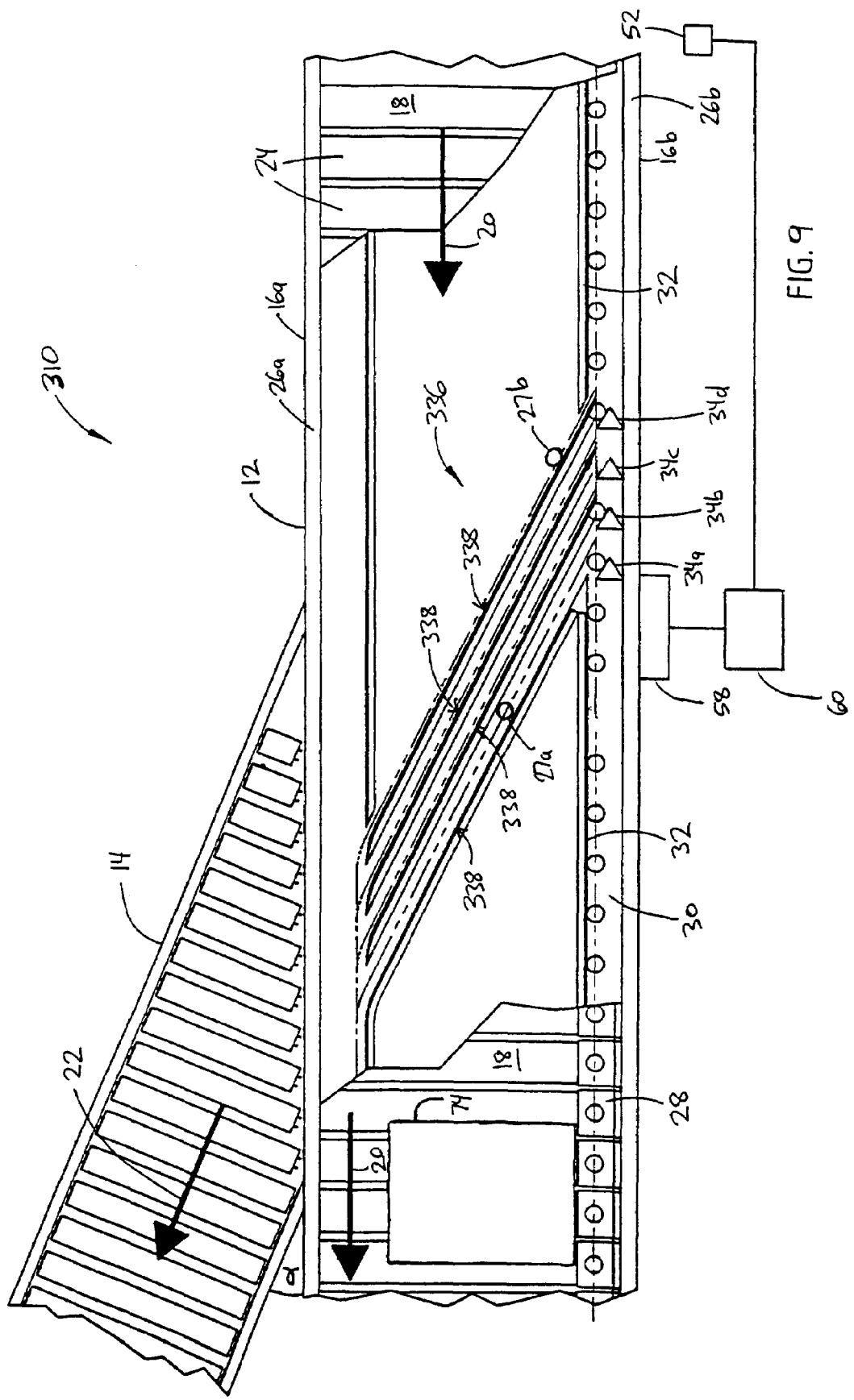
FIG. 9 is a top plan view similar to FIG. 6, of a sortation assembly for a conveyor system according to yet another aspect of the present invention.

Another conveyor system 310 is depicted in FIG. 9. Components of system 310 in common with system 10 bear the same reference numeral while modified components bear the same number summed with 300. Conveyor system 310 includes four diverting tracks or rails 338 that are generally straight and parallel to each other for substantially their entire length. The downstream ends of diverting rails 338 may be curved in order to reduce the impact of the follower portion 27 with side 16a of the conveyor 12. Alternatively, a noise and wear reducing apparatus, such as that disclosed in commonly assigned U.S. Pat. No. 5,732,814 issued to Owczarzak et al., the disclosure of which is hereby incorporated by reference, may be placed adjacent each terminal end of diverting rails 338 in order to lessen the noise and wear of follower portions 27 impacting the side of the conveyor. The same apparatus may be used at the terminal end of the diverting tracks in any of the other embodiments of the invention described herein in order to reduce noise and wear. Conveyor system 310 differs from the preceding embodiments in that the diverting rails 338 have only one divert angle. However, as will be explained below, control techniques are provided to enhance system throughout. It should be understood that these techniques can also be provided to the previously illustrated embodiments.

The various conveyor systems 4 through 410 may be equipped with at least one sensor 52, operably connected to a control system 60, to thereby determine the length of each package being transported along the conveyor system. Sensor 52 may be any sensor commonly used in the art, such as photosensors, and is positioned in proximity to, or along main conveyor 12, preferably upstream of diverting track network 36 of main conveyor 12. Control system 60 is in electrical communication with a divert control module 58. Divert control module 58 oversees the actual activation of diverters 34 into their diverting state based on commands received from controller 60. Control system 60 and divert control module 58 may be of the type disclosed in commonly assigned U.S. patent application Ser. No. 10/163,788 by Zeitler et al. for a TIERED CONTROL ARCHITECTURE FOR MATERIAL HANDLING, the disclosure of which is hereby incorporated by reference.

When a particular package or article is to be diverted onto branch conveyor 14, divert control module 58 causes the selective actuation of one or more diverters 34. In one embodiment, divert control module 58 may simultaneously activate two or more diverts 34 to cause an article to be diverted. In such a system, controller 60 may cause the divert control module 58 to effect actuation of the diverter 34 that is farthest downstream along main conveyor 12, when the leading end of a package is adjacent to it. Simultaneously, controller 60 will cause the divert control module to actuate an upstream diverter 34 along a corresponding upstream diverting track 38. The upstream diverter 34 that will be selected may be whichever is most proximate to the trailing end of the package. The activation of the diverters 34 into their diverting state may be carried out only for so long as necessary to allow a single shoe 28 to be diverted to a corresponding diverting track.

Although the invention is illustrated in FIG. 9 with two shoes being diverted to divert a package, any of the various embodiments of the present invention could utilize three or more diverting shoes for each package. Preferably, to the extent the article to be diverted substantially exceeds the length of two pushers, it is diverted using trailing and leading diverters which are separated by at least one intermediate diverter which is not activated into the diverting state. Where the article does not exceed the length of two pushers, two adjacent diverters may be used to divert the article. The invention is not intended to be limited by the configuration of the diverting shoe 28, the surface members 24, or the diverters 34.

Figure 12:
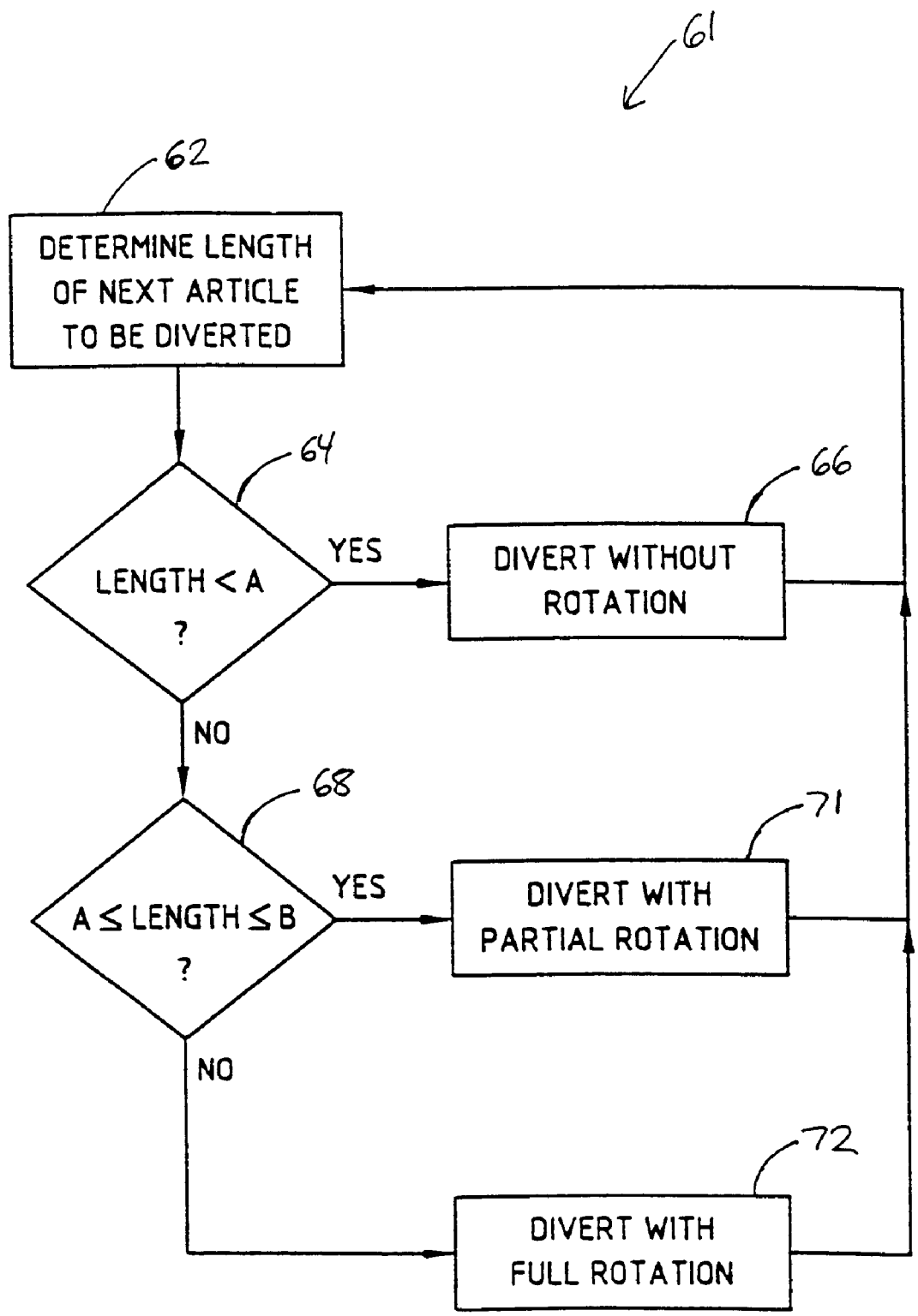
FIG. 12 is a flowchart of an alternative method for diverting an article from a conveyor.

In another embodiment of the present invention, controller 60 may use control logic 61 (FIG. 12). Control logic 61 is applicable to any of the conveying systems depicted and described herein, as well as to other conveying diverting assemblies, but is illustrated with reference to FIG. 9. Control logic 61 can activate only one diverter 34 to rotate and diagonally divert an article using conventional divert techniques such as disclosed in the '510 patent, can simultaneously activate two or more diverters 34 to divert an article entirely without rotation, or can delay the activation of the upstream diverter 34 for a variable length of time to partially rotate an article. This delay may be especially useful to accommodate widely varying lengths of articles without having to install as many diverters 34 and their associated diverting tracks 38 as the maximum length of packages would otherwise require where diverters are activated simultaneously. For example, if the maximum expected article length is three feet, and each diverter 34 can be spaced apart 4 inches, then a total of nine diverters 34 and their associated diverting tracks could be accommodated in the diverting area. However, nine diverters and diverting tracks may be undesirably expensive. In order to still be able to accommodate three foot long articles, a lesser number of diverters and diverting tracks could be used and spaced in a more compact area, such as a two foot area. In such a situation, control logic 61 would activate the downstream diverter when the leading edge of the article was adjacent to this downstream diverter. If the article were three feet long, the trailing edge of the article would not be adjacent the most upstream diverter at this time because the most upstream diverter is only two feet away from the downstream diverter. The activation of the most upstream diverter is therefore delayed until sufficient time has passed for the article's trailing edge to have moved adjacent the most upstream diverter. At that moment, the most upstream diverter is activated by control logic 61. The delay between the time the downstream diverter is activated and the time the upstream diverter is activated is dependent upon the speed of the conveyor as well as the length of the article being diverted relative to the distance between the upstream and downstream diverters. Alternatively, the delay between activating a first and second diverter can be increased such that the second diverter activated is not necessarily the most-upstream diverter, but may instead be another diverter. The activation of diverters 34 may be carried out so that only a single shoe 28 is diverted by each activated diverter 34.

An example of a partial-rotation divert being carried out by control logic 61 is depicted in FIG. 9. When the leading edge of the article to be diverted was adjacent downstream diverter 34a, diverter 34 was activated. At that time, controller 60, using control logic 61, activated only diverter 34a into a diverting state. This caused a single follower portion 27a of a shoe 28 to be diverted down the downstream-most diverting track 338. Controller 60 delayed activating diverter 34d into the diverting state until the trailing edge of the article had traveled sufficiently far so as to reach, or be adjacent to, diverter 34d. As illustrated, the activation of diverter 34d was delayed, by way of example, for the amount of time after diverter 34a was activated that it took for one surface member 24 to have passed by diverter 34d. This delay may be a function of the length of article being diverted utilizing a partial rotation. This is illustrated by follower member 27b, which is traveling adjacent the upstream-most diverting track 338.

Control logic 61 is diagrammed in FIG. 12. At block 62, the length of the next article to be diverted is determined. This length may be determined via sensor 52, or by any other suitable means. Based on the determined length of the next article to be diverted, control logic 61 will activate diverters 34 in different manners, as will now be described. At decision point 64, control logic 61 determines if the length of the next article to be diverted exceeds a distance A or not. If it is less than distance A, the article is diverted at step 66 without rotating it. Such a non-rotational diversion can be accomplished in any suitable manner such as, for example, by activating two or more diverters 34 substantially simultaneously. Because diverting tracks 38-438 are generally parallel to each other, the substantially simultaneous activation of two or more of these diverters 34 will cause the article to be diverted without rotation. Preferably the two or more diverters 34 to be activated include one diverter 34 that is adjacent the upstream edge of the article and one diverter 34 that is adjacent the downstream edge of the article.

If the length of the article to be diverted exceeds the distance A, then control passes to decision point 68. Decision point 68 determines whether or not the length of the article to be diverted falls between lengths A and B, with length B being greater than length A. If the length of the article falls between lengths A and B, the article is diverted at step 71 with partial rotation. The partial rotation of the article may be accomplished by activating two of diverters 34 into the diverting state at different times. In one embodiment, a diverter 34 adjacent the downstream end of the article is first activated into the diverting state. Thereafter, a second diverter 34 that is upstream of the activated diverter 34 is also activated into the diverting state. The second activated diverter 34 may desirably be adjacent the upstream edge of the article to be diverted when it is activated into the diverting state. For example, in the conveying system 10, diverter 34a may first be activated when the downstream edge of the article is adjacent diverter 34a. The activation of diverter 34a will cause at least one shoe 28 to be diverted along the corresponding diverting track 38. This at least one shoe will exert a rotational force onto the article being diverted, thereby causing it to rotate. When the trailing edge of the article reaches one of the upstream diverter 34b-d, it is activated. This causes a shoe to follow along one of the corresponding upstream diverting tracks 38. This shoe will exert a force on the article that tends to stop the rotation of the article. The article will thus be diverted by experiencing a rotational force for an initial time period followed by a generally non-rotational force for a subsequent time period. The selected upstream diverter may be based on the closest divert 34 to the trailing edge of the article at the time that the amount of delay has expired.

If the length of the article is determined at step 68 to not lie between lengths A and B, then it must be greater than length B. In this situation, the article is diverted with full rotation at step 72. This diverting is carried out by activating only a single diverter 34. While the single diverter 34 that is to be activated may desirably be the most downstream diverter (diverter 34a in FIG. 6), the invention contemplates activating other diverters 34. The activation of the single diverter 34 can be maintained to allow more than one shoe 28 to be diverted onto a diverting track 438a. Alternatively, only a single shoe 28 may be diverted. Because no other diverters are activated in this method of diverting, the article will continue to experience a rotational force until it is rotated generally parallel to the final angle of the diverting track 38.

Distance A of FIG. 12 may be based upon the width of the conveying surface of branch conveyor 14. Because articles will be diverted without rotation by control system 60 when they are less than distance A, these articles will enter branch conveyor 14 with an orientation that is not parallel to the longitudinal extent of branch conveyor 14. This orientation will increase the effective width of the article with respect to the branch conveyor 14. The effective width of the article refers to the total distance in the longitudinal direction that an article will travel from the time an initial portion of the article is pushed off of main conveyor 12 until it is completely pushed off of conveyor 12. If the effective width of the article is greater than the actual width of branch conveyor 14, the article may not fit onto branch conveyor 14 without rotating, jamming, or falling off of the conveyors. Distance A should therefore be set at an amount that prevents these potential problems. Distance A may also be based partially upon the longitudinal distance between two shoes that are simultaneously activated by the most upstream and most downstream diverters 34. If articles exceed this length by too great a distance, then the simultaneous activation of two or more diverters 34 may undesirably cause the article to rotate, depending upon where the shoes 28 impact the article in relation to the article's center of gravity. Distance A may therefore be limited by both the width of the branch conveyor 14 and the longitudinal distance between simultaneously activated shoes on the upstream and downstream-most diverting tracks 38.

Distance B of FIG. 12 may be based upon article lengths that have the potential to jam if they are diverted without rotation for any substantial length of time. In general, these articles will be relatively long articles. In order to prevent this potential jamming, articles that exceed length B should be diverted using only a single diverter 34, which is preferably, although not necessarily, the most downstream diverter 34 in the diverting assembly.

It will be understood that the control logic followed by control system 60 can be implemented on diverting assemblies that vary from those depicted in FIGS. 6-10. For example, control system 60 can use the control logic described herein on any of the diverting assemblies disclosed in commonly assigned U.S. Pat. No. 6,513,642, issued to James T. Shearer, Jr. et al., the disclosure of which is incorporated herein by reference. It can also be used with still other diverting assemblies. Control logic 61 can also be modified to not include steps 68 and 72. With such a modified system, any articles that exceeded the length A would be diverted with partial rotation. Alternatively, steps 68 and 71 of control logic 61 could be eliminated. Other variations are also possible.

Figure 11:
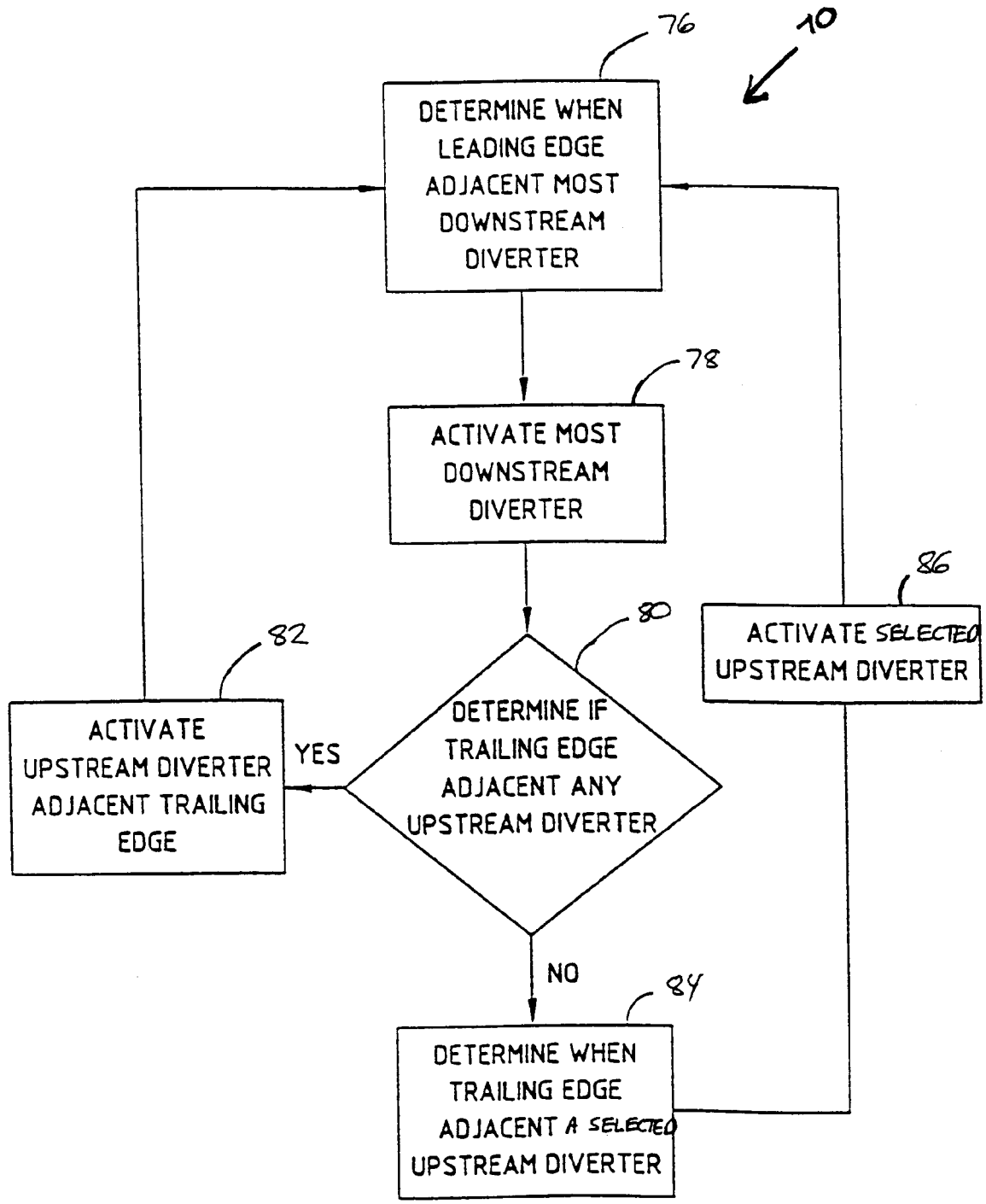
FIG. 11 is a flowchart of a first method for diverting an article from the conveyor.

Another example of control logic 70 that may be used in any of the embodiments described herein for carrying out diverts is depicted in FIG. 11. Control logic 70 carries out partial-rotation diverts or non-rotation diverts. Logic 70 first determines at block 76 when the leading edge of the article to be diverted is adjacent the most downstream diverter. At that moment, control logic 70 activates the downstream diverter in block 78. At block 80, control logic 70 also determines if the trailing edge of the article is adjacent any diverters and, if so, activates the diverter adjacent the trailing edge at block 82. Where the trailing edge of the article is adjacent an upstream diverter at the same time the leading edge is adjacent the downstream diverter, the activation of the upstream and downstream diverters in blocks 78 and 82 occurs substantially simultaneously. If, at block 80, it is determined that the trailing edge of the article is not adjacent any upstream diverter, this is due to the article being longer than the length of the diverter array. In this case, control passes to block 84 where control logic 70 waits until the trailing edge of the article arrives at a location adjacent a selected upstream diverter. Control logic 70 then activates the selected upstream diverter at block 86 and control returns to block 76 for the next article to be diverted. The selected upstream diverter may preferably be the upstream-most diverter 34, although other diverters could be selected.

As noted, control logic 70 determines whether to activate diverters simultaneously or non-simultaneously based on the length of the article. By choosing between non-simultaneous and simultaneous diverter activation, control logic 70 allows the conveying system to divert articles that exceed the maximum distance between the furthest downstream diverter 34 and the furthest upstream diverter 34 in a particular diverting area. While the non-simultaneous diverting of pusher shoes will result in the article experiencing an initial rotational force, such rotation may be acceptable in order to limit the expenses by reducing the number of diverters and their associated diverting tracks. Further, by reducing or eliminating the amount of rotation of articles being diverted, the spacing between articles can be reduced, thereby increasing the throughput of the system. Control logic 70 may be used with any of the diverting track configurations depicted in the attached drawings, or still other configurations.

In determining whether an article's leading or trailing edge is adjacent a diverter, one or more sensors 52, such as a photo-eyes or other conventional sensors, may be used. Such sensors can be placed at an any known location and may be used in combination with other sensors, such as encoders that measure the movement of the conveying surface, to determine an article's position and/or length.

According to another embodiment of the invention, another method of selecting which diverters 34 to activate into a diverting state takes into account the axis of rotation of the articles to be diverted. In this method, controller 60 selects which one or ones of diverters 34 to activate based on the location of the axis of rotation of an article relative to the position of the diverters 34. Controller 60 selects diverters 34 so that an article is impinged by pusher shoes 28 that impact the article along its side in at least one location that is upstream of the axis of rotation and at least one location that is downstream of the axis of rotation. By selecting shoes in this manner, the article will experience a force that is generally balanced on either side of the axis of rotation so that it will not rotate more than that allowed by pusher shoes 28.

For example, suppose an article is to be diverted that has an eight inch length, that the longitudinal extent of pusher shoes 28 is six inches, and that this six inch extent is centered over, and doesn't extend beyond, each surface member 24. Suppose further that the axis of rotation of the article passes precisely through the center of the article. Controller 60 receives information from sensor 52, or other known sensors, that tells it where the article is located with respect to the underlying surface member 24. If the axis of rotation of the article lies right between two adjacent surface member, then controller 60 determines that the article will have to be diverted by activating two diverters 34. Activating only a single diverter in this case would cause only about half of the pusher shoe's longitudinal extent (3 inches in this example) to impact the article, because the shoes are centered on the surface members and don't extend substantially beyond the edges of the surface members. This impact would occur along either the front three inches or rear three inches of the eight inch article, depending on which diverter 34 was activated. Because the force of the pusher shoe 28 would be entirely upstream or entirely downstream of the pusher shoe, but not both, the force against the article would be imbalanced, and the article would rotate. This rotation might be so great as to cause the article to rotate out of contact with the pusher shoe 28, in which case the article would likely not be diverted to the branch conveyor 14. Therefore controller 60 activates two diverters 34 so that the article is impinged by pusher shoes 28 both upstream and downstream of the axis of rotation.

As another example, suppose the axis of rotation of a eight inch article was precisely centered over a surface member 24. In this case, controller 60 selects only a single diverter 34 to be activated because a single pusher shoe 28 will impact the article both three inches forwardly of the axis of rotation and three inches rearwardly of the axis of rotation. The article will therefore not rotate because it is being impacted on both sides of its axis of rotation. Controller 60 therefore selects which diverters to activate based on the location that the pusher shoes will impact the article. Controller 60 selects the diverters so that the one or more pusher shoes that are diverted will impact locations on the article that are both upstream and downstream of the axis of rotation. Controller 60 may be programmed to divert sufficient shoes 28 so that the article is contacted at least one inch upstream and one inch downstream of its axis of rotation.

By selecting diverters 34 based on the article's axis of rotation, the inter-package spacing between articles can be reduced. For example, in the situation described above where the eight inch article is diverted by two diverters 34, the package will desirably have at least two inches of separation from both the upstream and downstream adjacent articles. Any less spacing than this will cause the two pusher shoes 28 that are diverted to impact against the adjacent articles, which is generally undesirable. However, in the situation where only a single shoe 28 is used to divert the article, the adjacent articles can have little or no spacing between themselves and the article being diverted. This is because the single shoe does not extend beyond either the forward or rearward edges of the article being diverted, and therefore will not impact against either of the adjacent articles. Articles can thus be more closely spaced where the activated diverting shoes 28 do not extend beyond the edges of the article being diverted, or where the amount of this extension is known and can thus be accommodated.

The determination of the article's axis of rotation can be performed upstream of conveyor 12 in any suitable fashion. This information is then transmitted to controller 60. As one example, the article's axis of rotation can be assumed to be aligned with the control point of an article as defined in commonly-assigned U.S. Pat. No. 6,629,593 issued to David W. Zeitler, the disclosure of which is hereby incorporated herein by reference. Controller 60 therefore chooses diverters 34 so that shoes 28 impact against both upstream and downstream locations on the article relative to this control point. Other methods may also be used.

It will be understood by one skilled in the art that the junctions of the various portions 40, 42, and 46 of diverting tracks 38 can preferably be modified from that illustrated. Specifically, the various drawings illustrate these sections to be entirely linear such that their junctions form sharp angles or edges. The junctions between each of these portions may advantageously be modified so that a more curved or gradual junction is defined between each portion. Using curved junctions between the portions of the diverting tracks 38 will reduce the wear and tear of both the guide-track following portion of the shoes 28, as well as the wear and tear of the guide tracks themselves. In addition to a reduction in wear and tear, smoothing the transitions between the diverting track portions will also likely reduce the noise created by the diverting conveying system.

Having described the invention in connection with certain specific embodiments thereof, it is to be understood that the description is meant to be interpreted as illustrative only, and that various modifications may also be made by those skilled in the art without departing from the spirit and scope of the invention as expressed in the accompanying claims.

What is claimed is:

1. A conveyor sorter, comprising:
a conveying surface movable in a longitudinal direction;
a plurality of pusher shoes capable of traveling laterally of said conveying surface;
at least one diverting rail configured to selectively guide at least one of said pusher shoes laterally of said conveying surface; and
at least one diverter associated with said at least one diverting rail, said at least one diverter adapted to selectively transfer the at least one of said pusher shoes to said at least one diverting rail;
wherein said at least one diverting rail has at least a first portion adjacent the associated one of said diverters and a second portion extending from an end of said first portion away from said associated one of said diverters, said first portion having a first angle with respect to said longitudinal direction and said second portion having a second angle with respect to said longitudinal direction that is different from said first angle, wherein the at least one of said pusher shoes guided by said at least one diverting rail traveling at a first lateral rate along said first portion and traveling at a second lateral rate along said second portion, said second lateral rate being different from said first lateral rate.

2. The sorter in claim 1 including a control, said control sensing said pusher shoes and selectively operating said at least one diverter to selectively transfer the at least one of said pusher shoes to said at least one diverting rail.

3. The sorter in claim 1 wherein said at least one diverting rail has a third portion extending from an end of said second portion that is opposite said first portion, said third portion having a third angle with respect to said longitudinal direction that is different from said second angle.

4. The sorter of claim 3 wherein said third angle is the same as said first angle.

5. The sorter of claim 3 wherein said second angle is less than said first and third angles.

6. The sorter of claim 3 further including a take-away conveyor extending from a lateral side of said sorter opposite from said plurality of diverters, said third portion of said plurality of diverting rails being substantially parallel to a longitudinal extent of said take-away conveyor.

7. The sorter in claim 1 wherein said second portion is adjacent a terminal portion of said diverting rail.

8. The sorter of claim 1 further including a take-away conveyor extending from a lateral side of said sorter opposite from said plurality of diverters, said second portion of said plurality of diverting rails being substantially parallel to a longitudinal extent of said take-away conveyor.

9. The sorter in claim 1 wherein said second angle is less than said first angle.

10. The sorter of claim 1 wherein said at least one diverting rail comprises a plurality of diverting rails and wherein said at least one diverter comprises a plurality of diverters, each adapted for selectively transferring at least one of said pusher shoes to one of said diverting rails and wherein said plurality of diverting rails are generally parallel to each other.

11. The sorter of claim 10 wherein said plurality of diverting tracks and said plurality of diverters cooperate to divert an individual article.

12. The sorter of claim 11 wherein said plurality of diverting tracks and said plurality of diverters divert an individual article without substantial rotation of that article.

13. The sorter of claim 11 wherein said plurality of diverting tracks and said plurality of diverters divert an individual article with an initial rotation of that article.

14. The sorter of claim 10 further including a controller adapted to cause at least two of said diverters to substantially simultaneously transfer, at least two of said follower members onto at least two of said diverting rails.

15. A conveyor sorter, comprising:

a conveying surface movable in a longitudinal direction;

a plurality of pusher shoes capable of traveling laterally of said conveying surface;

at least one diverting rail configured to selectively guide at least one of said pusher shoes laterally of said conveying surface; and at least one diverter associated with said at least one diverting rail, said at least one diverter adapted to selectively transfer the at least one of said pusher shoes to said at least one diverting rail;

wherein said plurality of diverting rails have at least a first portion adjacent the associated one of said diverters and a second portion extending from an end of said first portion away from said associated one of said diverters, said first portion having a first angle with respect to said longitudinal direction and said second portion having a second angle with respect to said longitudinal direction that is different from said first angle, wherein said first angle is less than said second angle, wherein the at least one of said pusher shoes guided by said at least one diverting rail traveling at a first, lateral rate initially contacts an article on said conveying surface at said first portion and wherein the at least one of said pusher shoes traveling at a second lateral rate along said second portion, said second lateral rate being higher than said first lateral rate.

16. The sorter of claim 15 including a control, said control sensing said pusher shoes and selectively operating said at least one diverter to selectively transfer the at least one of said pusher shoes to said at least one diverting rail.

17. The sorter of claim 15 wherein said at least one diverting has a third portion extending from an end of said second portion that is opposite said first portion, said third portion having a third angle with respect to said longitudinal direction that is different from said second angle.

18. The sorter of claim 17 wherein said third angle is the same as said first angle.

19. The sorter of claim 17 further including a take-away conveyor extending from a lateral side of said sorter opposite from said plurality of diverters, said third portion of said plurality of diverting rails being substantially parallel to a longitudinal extent of said take-away conveyor.

20. The sorter of claim 15 wherein said second portion is adjacent a terminal portion of said diverting rail.

21. The sorter of claim 15 further including a take-away conveyor extending from a lateral side of said sorter opposite from said plurality of diverters, said second portion of said plurality of diverting rails being substantially parallel to a longitudinal extent of said take-away conveyor.

22. A conveyor sorter, comprising:

a conveying surface movable in a longitudinal direction;

a plurality of pusher shoes capable of traveling laterally of said conveying surface;

at least one diverting rail configured to selectively guide at least one of said pusher shoes laterally of said conveying surface; and at least one diverter associated with said at least one diverting rail, said at least one diverter adapted to selectively transfer the at least one of said pusher shoes to said at least one diverting rail;

wherein said plurality of diverting rails have at least a first portion adjacent the associated one of said diverters and a second portion extending from an end of said first portion away from said associated one of said diverters, said first portion having a first angle with respect to said longitudinal direction and said second portion having a second angle with respect to said longitudinal direction that is different from said first angle, wherein said first angle is less than said second angle, wherein the at least one of said pusher shoes guided by said at least one diverting rail traveling at a first, lateral rate initially contacts an article on said conveying surface at said first portion and wherein the at least one of said pusher shoes traveling at a second lateral rate along said second portion, said second lateral rate being higher than said first lateral rate;

wherein said at least one diverting rail is at least partially curved thereby providing a gradual junction between said first and second portions.

23. The sorter of claim 22 including a control, said control sensing said pusher shoes and selectively operating said at least one diverter to selectively transfer the at least one of said pusher shoes to said at least one diverting rail.

24. The sorter in claim 22 wherein said at least one diverting has a third portion extending from an end of said second portion that is opposite said first portion, said third portion having a third angle with respect to said longitudinal direction that is different from said second angle.

25. The sorter of claim 24 wherein said third angle is the same as said first angle.

26. The sorter of claim 24 wherein said at least one diverting has a third portion extending from an end of said second portion that is opposite said first portion, said third portion having a third angle with respect to said longitudinal direction that is different from said second angle.

27. The sorter of claim 22 wherein said second portion is adjacent a terminal portion of said diverting rail.

28. The sorter of claim 22 further including a take-away conveyor extending from a lateral side of said sorter opposite from said plurality of diverters, said second portion of said plurality of diverting rails being substantially parallel to a longitudinal extent of said take-away conveyor.

* * * * *

UNITED STATES PATENT AND TRADEMARK OFFICE
CERTIFICATE OF CORRECTION

PATENT NO. : 7,419,043 B2 Page 1 of 1
APPLICATION NO. : 11/422217
DATED : September 2, 2008
INVENTOR(S) : Frank W. Veit It is certified that error appears in the above-identified patent and that said Letters Patent is hereby corrected as shown below:

Column 1:
Line 7, Insert --continuation of U.S. Patent Application Ser. No. 10/907,970, filed Apr. 22, 2005, now U.S. Pat. No. 7,055,669, which is a-- before "division".

Column 6:
Line 24, "angle $\Psi$" should be --angle $\theta$--.

Column 9:
Line 10, "angle $\theta$" should be --angle $\Psi$--.

Signed and Sealed this

Twentieth Day of January, 2009

JON W. DUDAS
*Director of the United States Patent and Trademark Office*